April 29, 1924.
A. W. WALLIN
1,492,056
SPRING SYSTEM OF SPRING HAMMERS
Filed Dec. 16, 1921 3 Sheets-Sheet 1
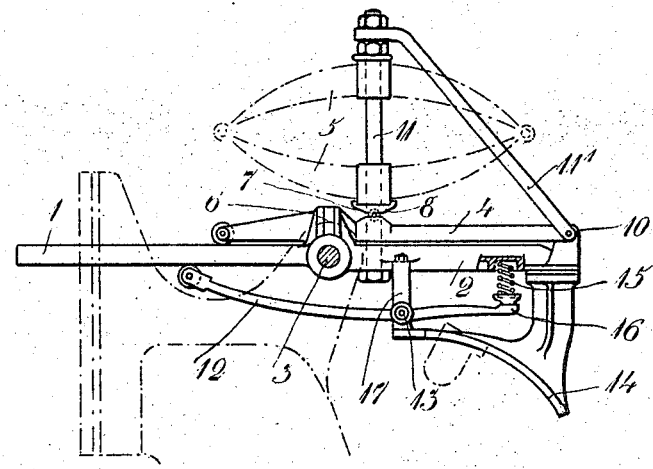
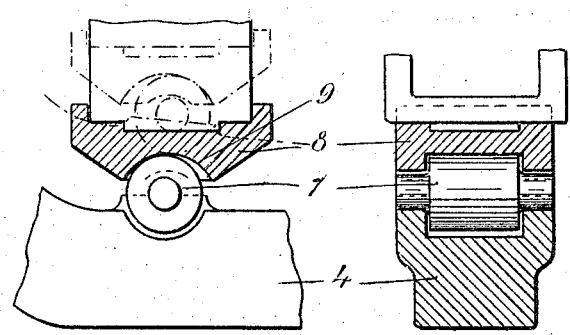
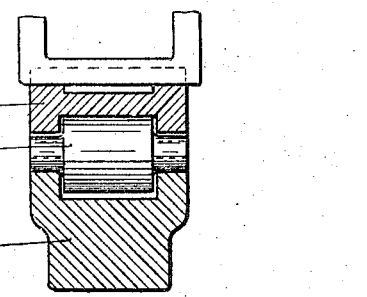
Inventor
A. W. Wallin
By Marks & Clerk
Attys April 29, 1924.

A. W. WALLIN 1,492,056

SPRING SYSTEM OF SPRING HAMMERS

Filed Dec. 16, 1921    3 Sheets-Sheet 2

Inventor
A. W. Wallin,
By Marks & Clerk
Attys.

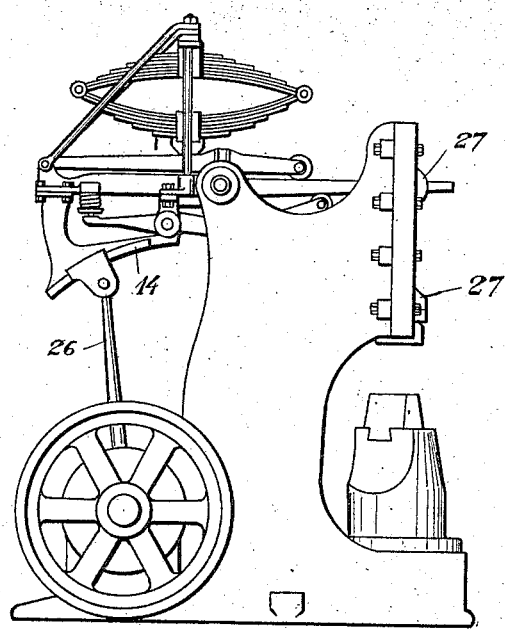

Patented Apr. 29, 1924.

1,492,056

UNITED STATES PATENT OFFICE.

ANDERS WILHELM WALLIN, OF KLAFRESTROM, SWEDEN, ASSIGNOR TO AKTIEBOLAGET KLAFRESTRÖMS BRUK, OF KLAFRESTROM, SWEDEN, A CORPORATION.

SPRING SYSTEM OF SPRING HAMMERS.

Application filed December 16, 1921. Serial No. 522,945.

*To all whom it may concern:*

Be it known that I, ANDERS WILHELM WALLIN, chief engineer, a subject of the King of Sweden, residing at Klafrestrom, Sweden, have invented certain new and useful Improvements in the Spring Systems of Spring Hammers, of which the following is a specification.

In spring hammers, the hammer arm generally consists of two parts pivoted each to a common axle, one of such parts being actuated partly from above by a spring system, through the intermediary of a presser arm, and partly from below by another spring system.

In the constructions of the said description as heretofore known, the upper spring system is either bearing on the presser arm of the hammer so as to slide thereon with friction, or it is rigidly connected with the latter.

In these arrangements, however, there will be either a considerable wear of the friction surfaces with a useless expenditure of power attending same, or, in the other case, where a rigid connection is employed between the spring system and the presser arm, the spring system is strained by tensions which, to a certain extent, counteract the proper operation of the hammer. In the one case as well as in the other, the efficiency of the machine is materially decreased.

With respect to the arrangement of the spring system actuating the hammer arm from below, the prior constructions again suffer from the disadvantage that it is not possible to impart so great a resiliency to the spring underneath the hammer arm that it will bear against said arm when the two parts thereof form an angle between them. The spring would be either too soft to carry the load of the hammer head, or it would have to be strained so much as to make the whole system stiff. Therefore, on the hammer arm assuming a certain position, the contact between the spring and the hammer arm would be interrupted, which would result in blows and cracks with an injurious influence on the efficiency of the machine, or even in breaking of the springs. Many endeavours have been made to avoid these drawbacks but without any favourable result.

According to the present invention, which has for its purpose to remove the said drawbacks, the upper spring system is movably arranged on the presser arm through the intermediary of a friction roller or the like journalled in the presser arm, said roller bearing a plate-member which in turn serves as a support for the spring system, while the presser arm is guided on either side by two bosses or the like provided on the one part of the hammer arm.

According to the invention the lower spring device consists of a spring-actuated arm which is pivotally mounted between the hammer arm and the slide bar, so as to act on the lower side of the hammer arm.

The invention is illustrated by way of example in the accompanying drawing in which, Fig. 1 is a side elevation of one embodiment, the said figure representing the upper portion of a hammer arranged according to the invention, whereas Figs. 2 and 3, which are drawn to a larger scale, show a detail, partly in section, and viewed in each of these figures at right angles to the other.

Fig. 5 is an assembly view of the entire hammer construction.

Figure 4:
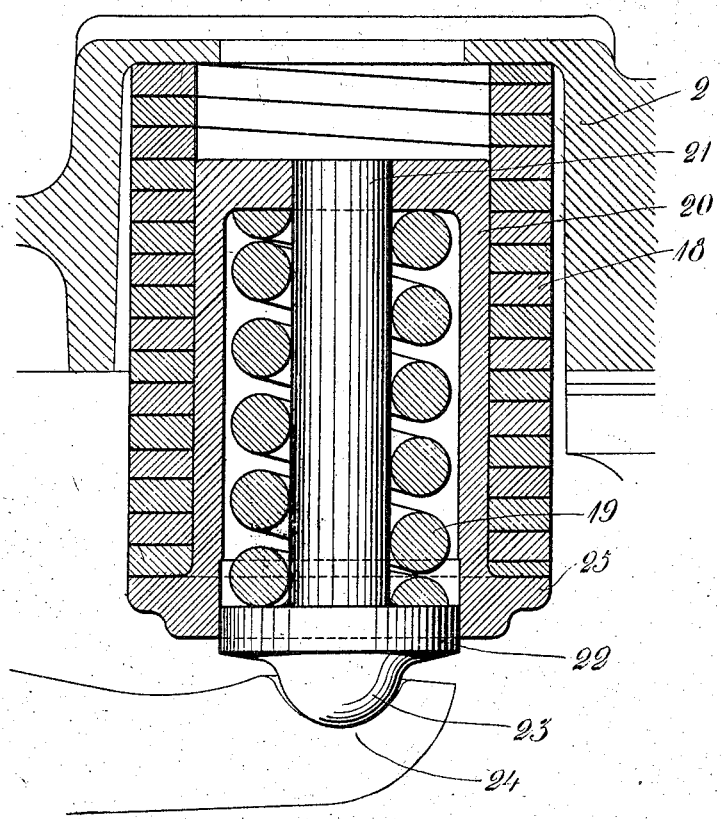
Fig. 4 shows the arrangement of a spring device according to the invention.

The hammer arm consists in known manner of two parts 1 and 2 pivoted each to a common axle 3, carrying the hammer head 27, while part 2 serves to receive the power and conveys it to part 1 through the intermediary of springs. The presser arm 4, pivoted as at 10 and actuated by the spring system 5, is provided with a friction roller 7 or the like having resting thereon a plate 8 preferably made of steel. This plate 8 is provided at the lower side thereof with a cup-shaped recess 9 engaging the roller 7, and carries on top thereof the spring system 5, the upper portion of which is held firmly by the clamping bolts 11 supported by the stay members 11¹. The presser arm 4 is guided laterally by the bosses 6 arranged on the one part 1 of the hammer arm.

By this arrangement, the compressing force of the spring system 5 may at all times act substantially in one and the same direction, that is to say in parallel with the tension bolts 11, while strains that would impede the proper working of the hammer are entirely avoided, in that the lower part of the spring system is moved through the movable connection with the presser arm, to and fro in the longitudinal direction thereof. According to the various angular positions of the hammer arm, the friction roller 7 will then assume different positions in the cup-shaped recess 9, as will be clearly seen from Fig. 2, where the relative position of the parts in the one end position of the hammer is shown by full lines, whereas the relative position of the parts in another position of the hammer is shown by dot-and-dash lines.

The spring device acting on the lower side of the hammer arm consists of an arm 12 which is pivotally mounted on a stud 13 in a bracket 17 between the rear part 2 of the hammer arm and the bar 14, which is integral with the bracket 17, and serves as an attachment for the small end of a connecting rod 26 (Fig. 5) by means of which power is applied to the hammer. In the embodiment shown, the said arm 12 is actuated by a spring system 15 compressed between the part 2 and a plate 16 carried by the arm 12 by means of a spherical joint. The spring system 15, which is shown in detail in Fig. 4, comprises two helical springs 18 and 19, the spring 19 being guided on the stud 21 inside the spring casing 20, whereas the spring 18 is mounted on the outside of said spring casing. The spring 18 is resting with its one end on the projecting flange 24, and with its other end bears against the bottom of a recess in the member 2. The spring 19 bears with its one end against the plate 22 provided with the spherical projection 23 resting in the socket 24 of the joint 23, 24, while the opposite end of spring 19 bears against the bottom of the spring casing 20.

The outer spring 19 is very long and soft, and it consequently has a great resiliency even on a small load. The object of this spring is to always keep the fore end of the arm 12 pressed against the hammer arm. When the hammer is in rest and the head of the hammer is depending freely, the spring 18 is wholly compressed. On the other hand, the inner spring 19 is short and stiff with a very little resiliency even on a great load. The object of spring 19 is to moderate the shock resulting when, on its downstroke, the hammer head is again jerked upwards. Through this arrangement, the compression and extension of the spring will always take place at right angles to the ends of the spring, independently of the deflection of the arm in motion. The spring may be given such a strength and length that it will always keep the opposite end of the arm 12 pressed against the fore part 1 of the hammer arm, independently of the relative position of the two parts.

There are no parts subjected to friction, nor do any undesirable strains set in that would impede the proper operation of the hammer, but the whole system is acting softly and with ease, and with a much higher efficiency than the hammers of previously known constructions, as has been found by practical tests.

What I claim as new and desire to secure by Letters Patent of the United States is:—

1. A spring hammer comprising in combination, a two-member hammer arm, each member being pivoted onto a common axle, a spring system acting on one side of the one member of the hammer arm through the intermediary of a presser arm arranged between the said spring system and the said member of the hammer arm, and an antifrictional member interposed between the said spring system and the said presser arm, making the connection between spring system and presser arm movable.

2. A spring hammer comprising in combination, a two member hammer arm, each member being pivoted onto a common axle, a spring system acting on one side of the one member of the hammer arm through the intermediary of a presser arm arranged between the said spring system and the said member of the hammer arm, and a friction roller interposed between the said spring system and the said presser arm, making the connection between spring system and presser arm movable.

3. A spring hammer as claimed in claim 2, wherein the said friction roller is pournaled in the presser arm and carries a plate which in turn serves as a support for the spring system.

4. A spring hammer comprising in combination, a two-member hammer arm, each member being pivoted onto a common axle, a spring system acting on one side of the one member of the hammer arm through the intermediary of a presser arm arranged between the said spring system and the said member of the hammer arm, an antifrictional member interposed between the said spring system and the said presser arm, making the connection between spring system and presser arm movable, and a second spring-actuated presser arm acting on the opposite side of the hammer arm, said spring-actuated presser arm being pivotally mounted between the hammer arm and the connecting member for the power transmitting means.

5. A spring hammer comprising in combination, a two-member hammer arm, each member being pivoted onto a common axle, a spring system acting on one side of the one member of the hammer arm through the intermediary of a presser arm arranged between the said spring system and the said member of the hammer arm, an antifrictional member interposed between the said spring system and the said presser arm, making the connection between spring system and presser arm movable and a second spring-actuated presser arm acting on the opposite side of the hammer arm, a helical spring device being disposed between the rear end of the said second presser arm and the rear portion of the hammer arm, said spring device bearing against a plate supported on the said presser arm by means of a spherical joint.

6. A spring hammer comprising in combination, a two-member hammer arm, each member being pivoted onto a common axle, a spring system acting on one side of the one member of the hammer arm through the intermediary of a presser arm arranged between the said spring system and the said member of the hammer arm, an antifrictional member interposed between the said spring system and the said presser arm, making the connection between spring system and presser arm movable, and a second presser arm acting on the opposite side of the hammer arm by means of a spring device consisting of two helical springs disposed within each other, and adapted to be compressed together through the medium of a casing, the bottom of which bears against one end of the one spring, while a flange of the said casing serves as a support for one end of the other spring.

In testimony whereof I affix my signature in presence of two witnesses.

ANDERS WILHELM WALLIN.

Witnesses:
B. H. BUGROLH,
K. E. WIBERG.